United States Patent [19]
Smith

[11] 4,120,735
[45] Oct. 17, 1978

[54] BRICK AND METHOD OF MAKING SAME

[75] Inventor: Robert H. Smith, Philadelphia, Pa.

[73] Assignee: Gilbert Associates, Inc., Reading, Pa.

[21] Appl. No.: 693,283

[22] Filed: Jun. 7, 1976

Related U.S. Application Data

[63] Continuation-in-part of Ser. No. 509,297, Oct. 25, 1974, abandoned.

[51] Int. Cl.$^2$ .............................................. C04B 35/16
[52] U.S. Cl. ................................ 106/84; 106/DIG. 1
[58] Field of Search .................. 106/84, 97, DIG. 1

[56] References Cited

U.S. PATENT DOCUMENTS

| | | | |
|---|---|---|---|
| 3,573,940 | 4/1971 | Cockrell et al. ........................ | 106/84 |
| 3,846,366 | 11/1974 | Wallace .................................. | 106/90 |

*Primary Examiner*—James Poer
*Attorney, Agent, or Firm*—William J. Ruano

[57] ABSTRACT

A brick or similarly fired construction unit and method of making it comprising mixing at least about 50% inorganic, non-ferrous residue from municipal incinerators, by weight, with coal fly ash and a binder, such as sodium silicate, and firing the mixture at a temperature of about 1700 to about 1900 to 2000° F. for about ½ hour. A preferred "optimum" composition for lower firing temperatures and less costly binders comprises about 50 to 60% incinerator residue, 0.5 to 10% of sodium silicate or other binder and the remainder fly ash fired at 1700°–1750° F., which produces compressive strength and water absorption properties superior to fly ash brick and equal to better than conventional clay brick, even though the firing temperature is about 300° less.

2 Claims, 4 Drawing Figures

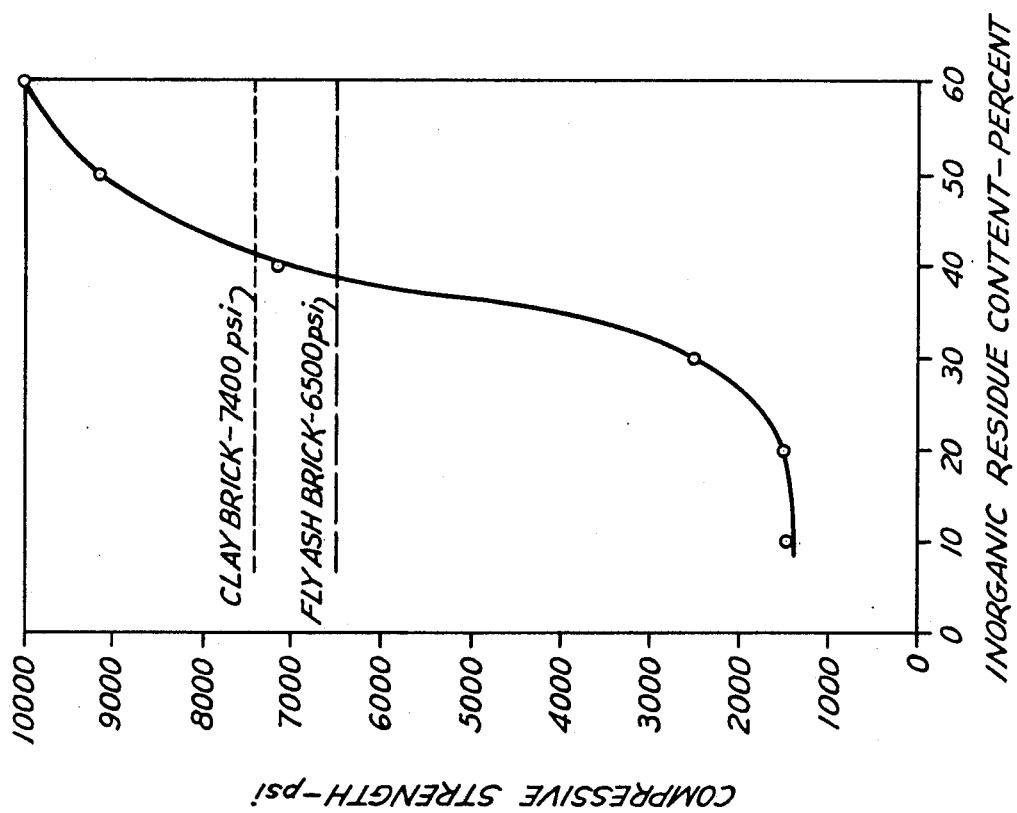
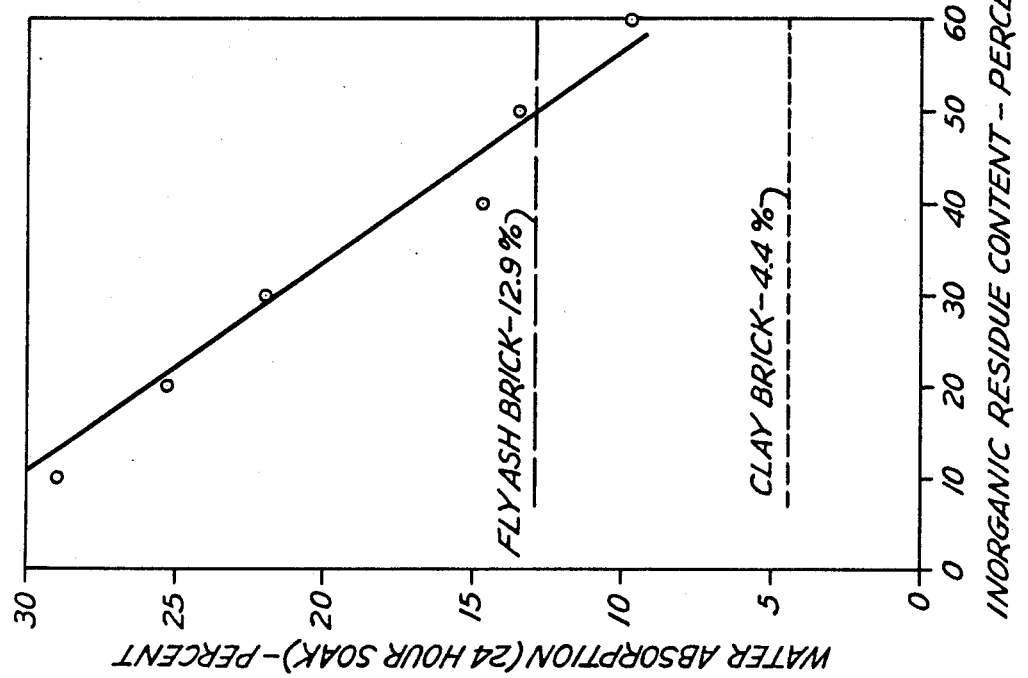

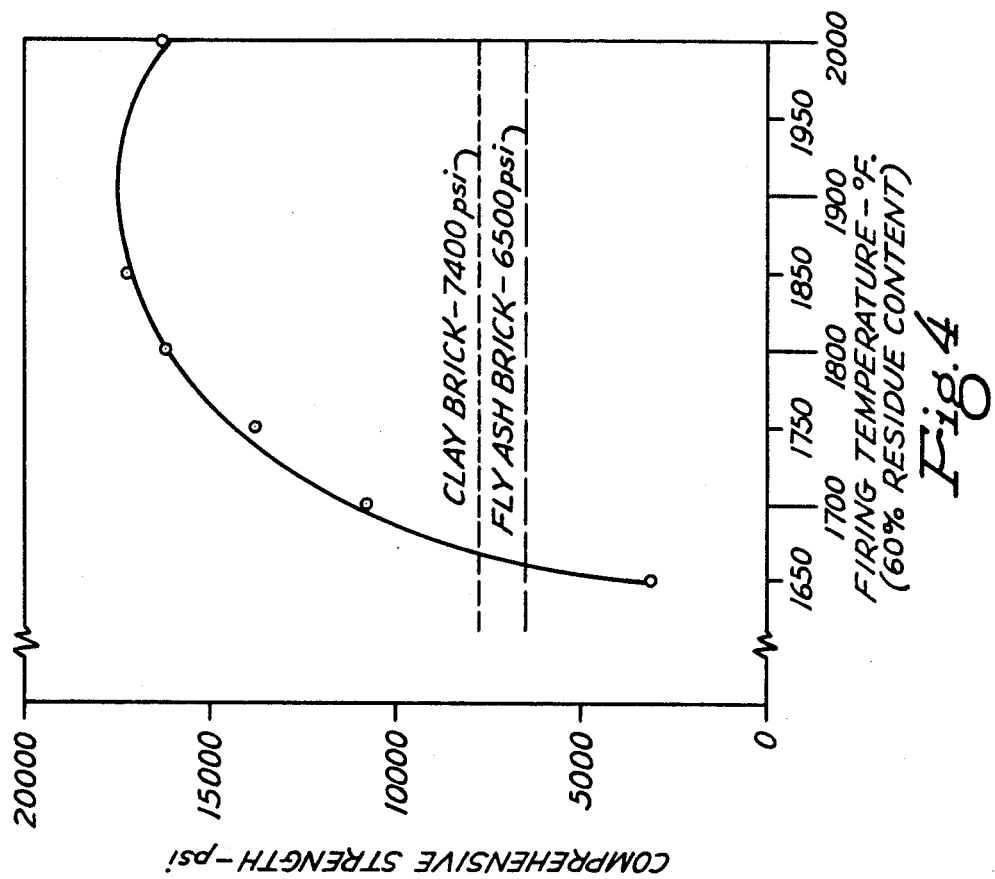
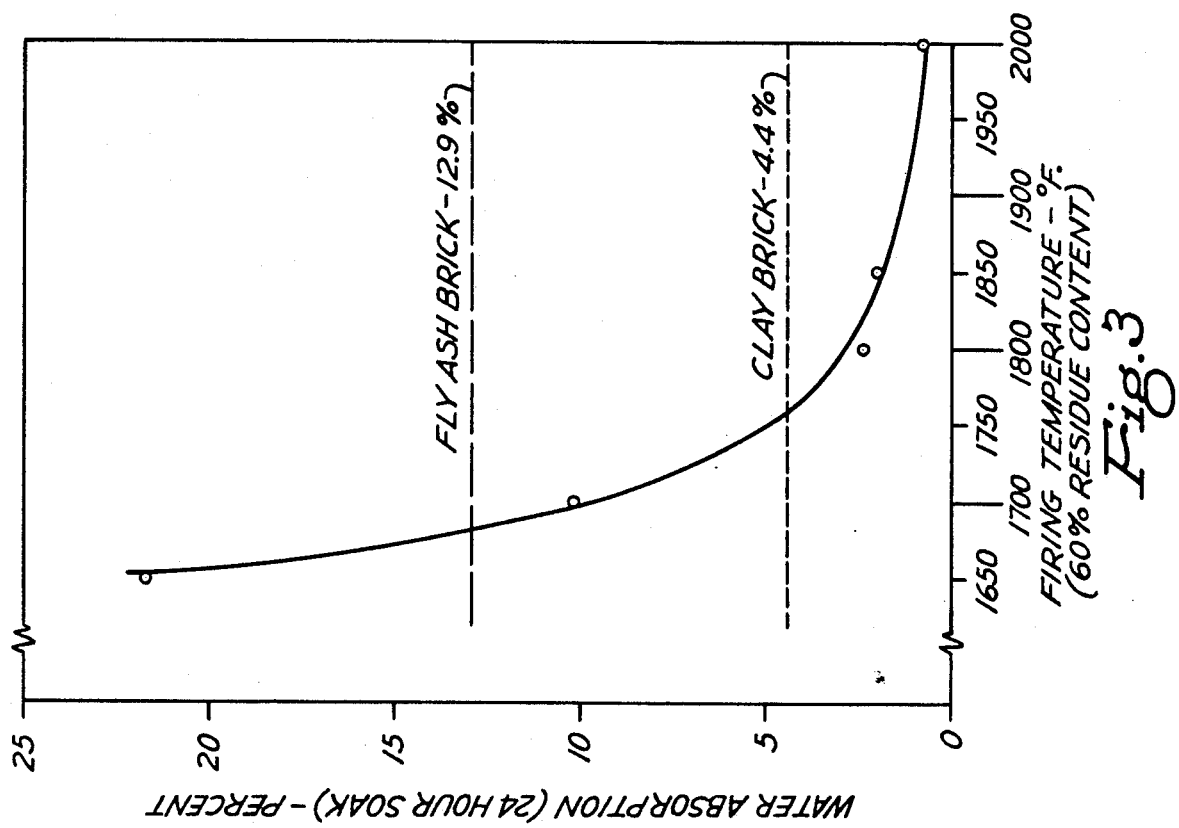

BRICK AND METHOD OF MAKING SAME

This is a continuation-in-part of application Ser. No. 509,297, filed Oct. 25, 1974 now abandoned.

This invention relates to the composition of a brick or similarly fired construction unit and to the method of making the same. More particularly, it relates to a composition including incinerator refuse as a major component and coal fly ash as a minor component for optimum results.

A disadvantage of the conventional fly ash brick is that it has relatively high water absorption characteristics and relatively low compressive strengths, — also it requires relatively high firing temperatures, — that is, generally in excess of 2000° F., which limits the number of binders useable because of the high temperature.

Likewise, conventional clay bricks have relatively low compressive strength and relatively high firing temperatures as compared to such characteristics of the present invention.

An object of the present invention is to provide a novel brick, or similar construction unit such as fired ceramic-type tile or vitrified pipe, which is devoid of the abovementioned disadvantages of conventional products and which has superior physical characteristics.

A more specific object of the invention is to provide a novel brick, or similarly fired construction unit, and method of making the same, which brick has higher compressive strength and lower firing temperature than the conventional fly ash brick, — also which has higher compressive strength and lower firing temperatures than the conventional clay brick and equal or better (lower) water absorption characteristics at higher firing temperatures.

Another specific object of the invention is to provide a novel composition of brick, or similarly fired construction unit, embodying municipal refuse and coal fly ash as its principal components, therefore, which is considerably less expensive in cost because of the great abundance of coal fly ash and municipal refuse.

Other objects and advantages of the present invention will become more apparent from a study of the following description taken with the accompanying drawings wherein:

FIG. 1 is a graph showing inorganic residue content versus water absorption of the brick embodying the present invention as compared to a fly ash brick and clay brick;

FIG. 2 is a graph showing inorganic residue content versus compressive strength;

FIG. 3 is a graph showing water absorption versus firing temperature; and,

FIG. 4 is a graph showing firing temperature versus compressive strength.

At present, there are tremendous quantities of fly ash available for utilization. In addition, considerable amounts of inorganic residue from municipal incinerators exist and the residue remaining from the many municipal refuse processing/fuel preparation plants which are currently planned will shortly be available. Utilization of these wastes will conserve natural resources and free land which otherwise would be required as landfill disposal sites for other more desirable uses.

Attempts have been made in the past to use fly ash bricks, however they have not been truly successful because of certain physical limitations, such as low compressive strength, high water absorption and high firing temperatures.

In accordance with the present invention, the materials used are essentially the nonferrous, inorganic portion of municipal refuse, coal fly ash, and a binder, such as sodium silicate, as raw materials in fired (fused) building materials.

A suitable fly ash is one comprising 41.3% $SiO_2$; 32% $Fe_2O_3$; and 16% $Al_2O_3$; — although other fly ash compositions are also suitable.

The fly ash fineness is shown in the following:

Table 1

| Fly Ash Fineness | |
|---|---|
| Sieve Size | Percent Passing |
| No. 30 | 100.0 |
| No. 50 | 99.6 |
| No 100 | 99.1 |
| No. 200 | 93.1 |
| No 325 | 83.0 |

The inorganic portion of the municipal incinerator refuse used, principally glass, is the −4 mesh material, which is a wet mixture of metals, glass, slag, charred and unburned paper, and ash. This material is passed through a 1¼ inch trommel screen in which cans, wire, large iron, some nonferrous metal, paper, glass and other nonmetals are scaped off. The plus 1¼ inch material is shredded and joined with the minus 1¼ inch fraction. After further screening, magnetic separation of ferrous metals followed by hammermilling takes place. The milled material is vibrated on a 4-mesh screen to recover 75 percent of the nonferrous metals. The minus 4-mesh fraction (the material used in the present study) is composed of some nonferrous metal, glass, and other nonmetals.

The sodium silicate solution used was Fisher Technical Grade, 40°–42° Be.

METHODS

Inorganic Residue Fusion Temperature

Standard ash fusion temperature determinations were carried out on the inorganic residue in order to obtain some guidance as to what firing temperatures should be employed. The tests were carried out in a reducing atmosphere with concurrent calibration using a gold wire. Three temperatures were recorded; Initial Deformation, Softening, and Fluid.

Residue Content Optimization

A series of pressed pill specimens were prepared for testing designed to investigate the effect of changes in inorganic residue content on saturated unconfined compressive strength and water absorption (24 hour soak) at a particular firing temperature. The pill specimens were prepared by placing approximately 9–10 grams of the desired mix in a Carver Press (1¼ in. dia. mold) and compacting at 4000 psi. The resulting pill specimens were approximately 154 inch thick.

The composition of the specimens produced for this series of tests is shown in Table 2.

Table 2

| Constituents of residue content Optimization Specimens | |
|---|---|
| Set Designation | Constituents |
| 10 | 10% incinerator residue<br>87% fly ash<br>3% sodium silicate |

Table 2-continued
Constituents of residue content Optimization Specimens

| Set Designation | Constituents |
|---|---|
| 20 | 20% incinerator residue |
| | 77% fly ash |
| | 3% sodium silicate |
| 30 | 30% incinerator residue |
| | 67% fly ash |
| | 3% sodium silicate |
| 40 | 40% incinerator residue |
| | 57% fly ash |
| | 3% sodium silicate |
| 50 | 50% incinerator residue |
| | 47% fly ash |
| | 3% sodium silicate |
| 60 | 60% incinerator residue |
| | 37% fly ash |
| | 3% sodium silicate |

In order to obtain pills suitable for handling, process water was added in an amount equal to 5 percent by weight of the other constituents. In the case of Sets 10, 20 and 30, two pills each were fabricated, while three pills each were produced for Sets 40, 50 and 60.

All specimens were fired at 350° F. for 1 hour and then fired at 1900° F. for Sets 10, 20 and 30 and at 1930° F. for Sets 40, 50 and 60. The specimens were held at 1000° F. overnight for carbon burn-off while the firing rate was approximately 150° F/hr except for this period. Due to the lag in furnace response to a higher temperature setting the new temperature setting was only reached during a small portion of each period.

As the set temperature became higher, the furnace response was slower so that the specimens were only at the last two firing temperatures (1900° F and 1930° F) for about 10 minutes.

After firing, the furnace was turned off and allowed to cool overnight. The following day, the procedure was begun for the 24 hour submersion test according to ASTM C5–66, Standard Methods of Sampling and Testing Brick. In addition, unconfined compressive strength tests were carried out on the saturated specimens in a manner generally in accordance with ASTM C67–66 except that no capping was applied to the specimens. The tests were conducted on the Carver Press.

In an effort to gain a preliminary insight into a possible difference in compressive strength between saturated and dry specimens, one pill each of 40, 50 and 60 percent residue content were fabricated in a manner identical to that described above. These were tested for unconfined compressive strength in a dry state (i.e., immediately upon removal from the furnace after overnight cooling).

Firing Temperature Optimization

A series of pressed pill specimens were also prepared for a test series designed to optimize firing temperature (i.e., the minimum temperature at which sufficient fusion will occur to produce brick of acceptable standards). The pills were prepared in a manner identical to those produced for the residue content optimization series. The proportions were: 60% residue, 37% fly ash, and 3% sodium silicate. In addition, process water was added in an amount equal to five percent by weight of the other constituents. A total of 18 pill specimens were prepared for this series and divided into six sets of three each. The firing temperatures employed are illustrated in Table 3.

Table 3
Firing Temperature Optimization

| Set Designation | Firing Temperature |
|---|---|
| A | 1650° F |
| B | 1700° F |
| C | 1750° F |
| D | 1800° F |
| E | 1850° F |
| F | 1980° F |

All specimens were oven fired for 1 hour at 350° F and then heated to 1000° F in increments of approximately 150° F/hour and held overnight for carbon burn-off. The following morning, incremental heating was again begun (150° /hr.) until the desired firing temperature was reached. In this series, care was taken to insure that each desired firing temperature was held for at least 30 min. in contrast to the 10 min, firing period for specimens in the residue content optimization series. As only four furnaces were available for use and six sets of specimens were fired (i.e., six different firing temperatures) two sets of specimens (B & D) were transferred to the furnaces used for the next lower firing temperature specimens (A & C) immediately after the firing period was over.

After firing, and the required transfer of specimens, the furnaces were turned off and allowed to cool overnight. The following day, the 24-hour submersion test was carried out, after which unconfined compressive tests were conducted.

Table 4
Inorganic Residue Fusion Temperature Results

Results

Inorganic Residue Fusion Temperature
The results of the fusion temperature test are shown in Table 4.

| | Temperature-° F |
|---|---|
| Initial Deformation | 1720 |
| Softening | 1940 |
| Fluid | 2020 |

Residue Content Optimization

The results of the residue content optimization tests are shown in Table 5.

Table 5
Residue Content Optimization Results

| Specimen | Inorganic Residue Content% | Dry Weight-gms. | Saturated Weight Gms. | 24-Hr. Absorption-% | Saturated Unconfined Compressive Strength-psi |
|---|---|---|---|---|---|
| 10A | 10 | 8.5014 | 10.9653 | 28.8 | 1,400 |
| 10B | 10 | 7.4661 | 9.6359 | 29.1 | 1,600 |
| 20A | 20 | 8.8286 | 10.9980 | 25.1 | 1,600 |
| 20B | 20 | 8.4807 | 10.6232 | 25.3 | 1,400 |
| 30A | 30 | 8.6507 | 10.5877 | 22.3 | 1,800 |
| 30B | 30 | 7.9556 | 9.6572 | 21.4 | 3,200 |
| 40A | 40 | 8.8314 | 10.1400 | 14.8 | 6,600 |
| 40B | 40 | 6.9314 | 7.9540 | 14.8 | 8,200 |
| 40C | 40 | 12.5530 | 14.4108 | 14.8 | 6,000 |
| 50A | 50 | 5.4830 | 6.2235 | 13.5 | 11,200 |
| 50B | 50 | 8.1825 | 9.3041 | 13.7 | 8,000 |
| 50C | 50 | 8.8342 | 10.0141 | 13.3 | 8,400 |
| 60A | 60 | 9.4230 | 10.3189 | 9.5 | 9,800 |
| 60B | 60 | 6.3306 | 6.9199 | 9.3 | 11,600 |
| 60C | 60 | 11.3360 | 12.5186 | 10.4 | 8,600 |

Average values computed from the above data are presented in Table 6 and FIGS. 1 and 2.

Table 6

| Averaged Results - Residue Content Optimization | | |
|---|---|---|
| Inorganic Residue Content-% | Average Absorption (24-Hr. Soak)-% | Average Compressive Strength-psi |
| 10 | 29.0 | 1,500 |
| 20 | 25.2 | 1,500 |
| 30 | 21.9 | 2,500 |
| 40 | 14.8 | 7,200 |
| 50 | 13.5 | 9,200 |
| 60 | 9.7 | 10,000 |

Examination of the residue content optimization specimens revealed a very definite color change in the fired products. As the residue content is increased, the specimens become much darker. The fired 10% residue-90% fly ash specimens exhibited the typical buff red color of conventional clay brick while the 60% residue-40% fly ash specimens were dark brown in color.

Results of the unconfined compressive strength tests on dry specimens together with corresponding averages for the saturated specimens are given in Table 7.

Table 7

| Comparison Of Dry and Saturated Compressive Strengths | | |
|---|---|---|
| Inorganic Residue Content-% | Dry Compressive Strength | Saturated Compressive Strength |
| 40 | 8,400 psi | 7,200 psi |
| 50 | 8,800 psi | 9,200 psi |
| 60 | 10,100 psi | 10,000 psi |

Firing Temperatures Optimization

The results of the firing temperature optimization tests in Table 8.

Table 8

| Averaged Results-Firing Temperatures Optimization | | |
|---|---|---|
| Firing Temperature | Average Absorption (24-Hr. Soak)-% | Average Compressive Strength-psi |
| 1650° F | 21.6% | 3,165 |
| 1700° F | 10.1% | 10,765 |
| 1750° F | 4.6% | 13,900 |
| 1800 | 2.4% | 16,100 |
| 1850 | 2.0% | 17,030 |
| 1980 | 0.8% | 16,465 |

Discussion

Inorganic Residue Fusion Temperature

The results of the inorganic residue fusion temperature determination (which was done first) were initially somewhat misleading. Although a fluid condition was not reached until 2020° F, later tests showed that considerable fusion occurs in mixtures of fly ash and incinerator residue at 1700° F (see Table 8). These later results were in the range expected considering that the inorganic residue is predominently glass. Table 9 presents fusion temperatures for three types of glass found in incinerator residue.

Table 9

| ASTM Fusion Temperatures of Incinerators Residue Glass | | | |
|---|---|---|---|
| Glass Type | Initial Deformation-° F | Softening-° F | Fluid-° F |
| Clear | 1480 | 1680 | 1840 |
| Brown | 1620 | 1750 | 2080 |
| Green | 1640 | 1800 | 2080 |

These fusion values were determined with a laboratory furnace having an oxidizing atmosphere. These temperatures could be somewhat lower in a reducing (oxygen deficient) atmosphere*. Firing of all pill specimens in the present work was done under oxidizing conditions so that melting properties similar to those reported in Table 8 were experienced. The higher values reported in Table 5 probably resulted from the iron, silicon and aluminum oxides present, along with glass, in the incinerator residue.

*Proceedings, 1968 ASME National Incinerator Conference page 140

Residue Content Optimization

The results of the inorganic residue content optimization series as presented in Table 6 demonstrate a very definite improvement in brick properties as incinerator residue is substituted for fly ash. The average absorption (24-Hr. Soak) decreased from 29.0 to 9.7 percent as the residue content was increased from 10 to 60 percent. The average compressive strength increased from 1500 psi to 10,000 psi over the same residue content interval. These improvements are illustrated in FIGS. 1 and 2 of the drawings.

As shown in FIG. 1, the water absorption values of all specimens except 60 percent residue were above the 12.9% absorption of fly ash brick. None of these specimens exhibited an absorption equal to or below that of clay brick which was 4.4 percent. FIG. 2 illustrates that both the 50 and 60 percent residue specimens exceeded both fly ash brick and clay brick compressive strengths.

The data presented in Table 7 does not indicate any conclusive difference in compressive strength between saturated and dry specimens. However, previous experience with other building materials suggests that the dry specimens should be somewhat stronger so that a slight difference might be revealed by a more extensive testing program.

FIRING TEMPERATURE OPTIMIZATION

The results of the firing temperature optimization series as presented in Table 8 indicate that with a 60 percent residue content, the water absorption decreases very rapidly with increasing firing temperatures between 1650° F and 2000° F. At 1700° F, the absorption is below that for fly ash brick and at 1750° F. is approximately equal to that for conventional clay brick (see FIG. 3).

The reason for the improvement in these 60 percent residue specimens over the 60 percent specimen tested in the residue content optimization series is that, in this case, firing temperatures were held for at least 30 minutes as against only about 10 minutes in the other case.

FIG. 4 illustrates the variation in compressive strength with firing temperature. Specimens fired at 1700° F and above all exhibited compressive strengths exceeding both fly ash and clay brick. It will be noted that a slight decrease in strength occured above approximately 1900° F. This is believed to have been caused by loss of liquid inorganic residue from the specimens during firing. After cooling, it was observed that the specimens stuck to asbestos cement plates on which they were setting during firing. The cementing action seems to have been developed because of physical inter-locking between the specimens and asbestos cement plates. The physical interlocking probably arose from tendril-like projections of liquid which formed from inorganic residue flowing out of the specimens during firing, into the asbestos pore structure and then solidifying during cooling.

The results of this series indicate that commercial brick of the present invention should be composed of 50–60 percent residue and be fired at about 1700°–1750° F. to 1800° F.. Utilizing these compositional and firing temperature ranges, such brick will possess compressive strength properties superior to both fly ash and conventional clay brick. In addition, absorption will be lower than fly ash brick and within the range generally acceptable to the construction industry (6–8%).

The abovementioned experiments appear to indicate that the binder may be used in the amount of about 0.5 to 10%, by weight, of the mixture, — preferably between about 1 and 4%.

CONCLUSIONS

It has been demonstrated that brick of the present invention composed of 50–60 percent incinerator residue and fired at 1700°–1750° F. for ½ hour will provide optimum results from the standpoint of use of lower firing temperatures and economics pertaining to price. It will exhibit compressive strength and water absorption properties superior to fly ash brick and equal to or better than conventional clay brick. The reduction in firing temperature below that for fly ash is about 15 percent (1700° F. vs 2050° F.).

This reduction in firing temperature is a key discovery of the present invention and had not been taught in the prior art. For example, Cockrell et al. U.S. Pat. No. 3,573,940, utilized fly ash and various types of inorganic wastes as aggregate for the production of fly ash brick. The inorganic waste aggregate is utilized principally to provide a path for moisture release during firing. When this aggregate (coal preparation waste, bottom ash, or sand) is employed, the required firing temperature is that needed to sufficiently melt the fly ash so that bonding occurs upon cooling. The most desirable temperature has been found to be 2050° F. or about 1020° C. Cockrell et al. did not teach the benefits to be gained by employing incinerator residue as illustrated by the fact that their preferred firing temperatures range from 980° C to 1150° C or 1800° F. to 2500° F. Cockrell et al. had not discovered that when incinerator residue is mixed with fly ash, it (the incinerator residue) rather than the fly ash, becomes the constituent which is melted to produce bonding upon cooling. Using incinerator residue, satisfactory bonding can be produced by firing to only 1700° F to 1750° F. which is completely outside, and less than, the preferred firing temperature range for non-incinerator residue material as stated by Cockrell et al.

It should also be noted that while it is attempted to eliminate ferrous metals, they could still be retained in very small quantities without seriously affecting the bricks. This is also true of traces of non-ferrous metals such as aluminum, copper and zinc.

While sodium silicate has been indicated as being a suitable binder, there exists a possibility of using a green binding agent which is less expensive and which could withstand firing temperatures as high as 1750° F., particularly in view of the fact that the present invention enables the use of lower firing temperatures than that used for making clay bricks.

Other suitable binding agents may be substituted for sodium silicate, such as the following organic binders which have lower melting point temperatures: liquid extract; lignin sulfonate; lignin ammonium sulfonate; paraffin; starch; cellulose gum; methyl cellulose; and, polyvinyl alcohol.

Thus it will be seen that I have provided a highly efficient method of making bricks, or similar construction units, out of waste material, such as coal fly ash and municipal incinerator residue, which bricks have better characteristics than conventional clay bricks, yet which are considerably less expensive and, at the same time, are helpful to conserve natural resources and free land which otherwise would be required as landfill disposal sites for incinerator waste from municipalities and other sources.

While I have illustrated and described several embodiments of my invention, it will be understood that these are by way of illustration only and that various changes and modifications may be contemplated in my invention and within the scope of the following claims.

I claim:

1. The method of making a brick or similar fired construction unit comprising mixing about 50 to 60% inorganic substantially non-ferrous residue from municipal incinerators, by weight, which is milled and passed through a 4 mesh screen and composed of non-ferrous metal, glass and other non-metals, with the remainder of coal fly ash together with a binder of about 1 to 4% by weight, of the mixture, shaping, and firing the mixture at a temperature of between about 1700° and 1750° F. for about ½ hour to provide greater compressive strength and less water absorption than ordinary fly ash brick or clay brick with less firing temperature.

2. The method recited in claim 1 wherein said binder is sodium silicate.

* * * * *